(12) United States Patent
Barza et al.

(10) Patent No.: US 8,378,639 B2
(45) Date of Patent: Feb. 19, 2013

(54) METHOD AND CHARGING DEVICE FOR CHARGING RECHARGEABLE LITHIUM ACCUMULATORS

(75) Inventors: Radu Barza, Heubach (DE); Alfred Schreiber, Kirchheim (DE)

(73) Assignee: C. & E. Fein GmbH (DE)

( * ) Notice: Subject to any disclaimer, the term of this patent is extended or adjusted under 35 U.S.C. 154(b) by 396 days.

(21) Appl. No.: 12/250,675

(22) Filed: Oct. 14, 2008

(65) Prior Publication Data

US 2009/0096425 A1    Apr. 16, 2009

(30) Foreign Application Priority Data

Oct. 16, 2007   (DE) .......................... 10 2007 051 052

(51) Int. Cl.
*H02J 7/00* (2006.01)
(52) U.S. Cl. ........................................ 320/156; 320/134
(58) Field of Classification Search .................... 320/156
See application file for complete search history.

(56) References Cited

U.S. PATENT DOCUMENTS

| | | | |
|---|---|---|---|
| 4,947,124 A | 8/1990 | Hauser | |
| 5,256,957 A | 10/1993 | Wiesspeiner | |
| 5,489,836 A * | 2/1996 | Yuen | 320/148 |
| 5,583,871 A | 12/1996 | Simmonds et al. | |
| 5,612,607 A | 3/1997 | Nicolai | |
| 6,008,628 A | 12/1999 | Brotto | |
| 6,227,204 B1 | 5/2001 | Baumann et al. | |
| 2006/0214639 A1 | 9/2006 | Miwa et al. | |
| 2007/0103113 A1 * | 5/2007 | Embrey et al. | 320/112 |
| 2008/0303485 A1 * | 12/2008 | Ng | 320/139 |

FOREIGN PATENT DOCUMENTS

| | | |
|---|---|---|
| DE | 3811371 A1 | 10/1989 |
| DE | 69406642 T2 | 6/1998 |
| DE | 19838137 A1 | 3/2000 |
| WO | 8908940 A1 | 9/1989 |

OTHER PUBLICATIONS

German Search Report; Application No. 102007051052.9; Dec. 3, 2010; 4 pages.

* cited by examiner

*Primary Examiner* — Arun Williams
(74) *Attorney, Agent, or Firm* — St. Onge Steward Johnston & Reens LLC

(57) ABSTRACT

A method and a charging device serve for charging rechargeable lithium accumulators. A charging current is injected into the accumulator, and the voltage is monitored on the accumulator during the injection process. Additionally, the variation in time of at least one state variable characteristic of the accumulator is monitored and injection of the charging current into the accumulator is continued until the variation in time of the state variable exceeds a predefined limit value.

10 Claims, 4 Drawing Sheets

METHOD AND CHARGING DEVICE FOR CHARGING RECHARGEABLE LITHIUM ACCUMULATORS

BACKGROUND OF THE INVENTION

The present invention relates to a method for charging rechargeable lithium accumulators where a charging current is injected into the accumulator and the voltage is monitored on the accumulator 10 during the injection process.

The invention further relates to a charging device for charging rechargeable lithium accumulators having first means for injecting a charging current into the accumulator and second means for monitoring the voltage on the accumulator during the injection process.

Finally, the invention relates to a lithium accumulator having first means for connecting the accumulator to a charging device and second means for monitoring the voltage on the accumulator during injection of a charging current.

A method, a charging device and a lithium accumulator of the afore-mentioned kind are known from DE 198 38 137 A1.

In mobile applications, there are in use today accumulators of different kinds, known as "battery packs", for example nickel-cadmium batteries (NiCd), nickel-metal hydride batteries (NiMH) and lithium-ion batteries. In the latter case, batteries using different metals (Mn, Ni, Co, Ti) in diverse combinations are known. While $LiCoO_2$ batteries are in use for electronic devices, such as portable computers, $LiMn_2O_4$, $LiNiO_2$, $LiTi_5O_{12}$, $LiNi_{1-x}Co_xO_2$ and the like are used for applications in electric tools, which is the field of particular interest for purposes of the present invention. Those accumulators have a cell mains voltage of between 3.6 and 3.7 Volts. More recently, lithium ion batteries of the lithium iron phosphate type have become known that have a cell mains voltage of 3.3 Volts.

It is a general problem of rechargeable accumulators that overcharging has to be avoided during the recharging process. The accumulators listed above show different degrees of sensitivity to overcharging, depending on type.

Lithium-ion accumulators are very sensitive to overcharging and may even catch fire or explode in extreme cases under overcharging conditions. On the other hand, it is desirable, with a view to achieving the longest possible operating period for the devices to be operated using those accumulators, that the accumulator be charged as completely as possible, that means that its capacity be utilized to the fullest possible degree.

Similarly, accumulators have different degrees of sensitivity to complete discharging, which even may lead to destruction of the accumulator with some accumulator types.

With a view to protecting accumulators from being damaged during charging and discharging, one has developed many criteria aimed at preventing overcharging and complete discharging by suitable control of the current supply. For example, it is a necessity that the number of cells and the charging parameters (final charging voltage) be known. In practice, these criteria often can be met with difficulty only. On the other hand, given the fact that accumulators are increasingly regarded as low-end articles, the target conflict between effective protection of the accumulator on the one hand and the related cost on the other hand has to be solved.

In the context of the present invention, the interest concentrates on lithium accumulators which, as has been mentioned before, are sensitive to overcharging. While for obvious reasons the method known from the afore-mentioned DE 198 38 137 A1, envisaged for the special case where an accumulator of an implant located in a human body is to be charged transcutaneously, is safe in operation with respect to the accumulator it does not make full use of the potential capacity of the accumulator.

SUMMARY OF THE INVENTION

It is a first object of the invention to disclose a method for charging rechargeable lithium accumulators that overcomes the drawbacks of the prior art.

It is a second object of the invention to disclose a charging device for charging rechargeable lithium accumulators that overcomes the drawbacks of the prior art.

It is a third object of the invention to disclose a rechargeable lithium accumulator that overcomes the drawbacks of the prior art.

It is a further object of the invention to disclose a method for charging rechargeable lithium accumulators which allows recharging without knowledge of the characteristics of the battery pack (such as number of cells, capacity).

It is a further object of the invention to disclose a method and a charging device for charging rechargeable lithium accumulators that allow the potential capacity of a lithium accumulator to be utilized in full without any risk of damage to the accumulator.

It is a further object of the invention to disclose a method and a charging device for charging rechargeable lithium accumulators that allow shorter charging times.

These and other objects of the invention are achieved by the fact that the variation in time of at least one state variable characteristic of the accumulator is monitored and injection of the charging current into the accumulator is continued until the variation in time of the state variable exceeds a predefined limit value.

With respect to a charging device of the afore-mentioned kind, the invention achieves the object by the fact that third means are provided for additionally monitoring the variation in time of at least one of the state variables characteristic of the accumulator and that fourth means are provided for continuing injection of the charging current into the accumulator until the variation in time of the state variable exceeds a predetermined limit value.

With respect to a lithium accumulator of the afore-mentioned kind, the invention achieves the object by the fact that third means are provided for additionally monitoring the variation in time of at least one of the state variables characteristic of the accumulator and that the third means generate a signal to the charging device to continue injection of the charging current into the accumulator until the variation in time of the state variable exceeds a predetermined limit value.

The objects of the invention are perfectly achieved in this way.

Namely, it is entirely the inventor's credit to have recognized that lithium accumulators allow injection of a certain charge beyond the point known heretofore, for example when the voltage reaches a predefined threshold value under constant charging current conditions, so long as one makes sure that the variation in time of given parameters remains below the respective associated threshold value.

A further advantage of the invention is seen in the fact that defective cells will not lead to overcharging of the accumulator. Namely, under conditions of conventional procedures, an 18 Volts accumulator would be charged to 16.8 Volts only in case one cell should become defective.

In the case of the method according to the invention, the charging current preferably is controlled along a predefined curve, i.e. is kept constant or, for example, pulsed periodically until the voltage reaches a predefined limit value.

In a first variant of the method according to the invention, it is the variation in time of the voltage that is monitored.

In tests, this especially preferred variant has proven to be particularly effective.

According to a second variant of the method according to the invention, it is however the variation in time of the temperature of the accumulator that is monitored.

Finally, according to a third variant of the method according to the intention, it is the variation in time of the internal resistance of the accumulator that is monitored.

It is especially preferred in this connection if at least two state variables of the accumulator are monitored at the same time, and if injection of the charging current into the accumulator is continued until one of the time variations of the at least two state variables exceeds the respective associated predefined limit value.

This feature provides the advantage that an especially safe charging process can be ensured, for example by monitoring the variation in time of the voltage according to the aforementioned first variant, while simultaneously monitoring the variation in time of the temperature so that the charging process will be interrupted already when the accumulator has reached is thermal limit, for example under conditions of extremely high environmental temperature, although the variation in time of the voltage has not yet reached its limit value.

It is especially preferred in connection with the aforementioned variants if the variation in time monitored is the rise in time.

According to a first variant of an embodiment of the invention, the charging current is switched off when the variation in time of the state variable exceeds the predefined limit value.

That feature provides the advantage that the charging process can be terminated relatively quickly.

In contrast, according to a second variant of an embodiment according to the invention, the charging current is gradually reduced to zero when the variation in time of the state variable exceeds the predefined limit value.

This feature provides the advantage that the charging process can be conducted even more gently for the accumulator.

Although basically the invention can be applied to lithium ion accumulators of any kind, using lithium iron phosphate accumulators is especially preferred.

That feature provides the advantage that it makes use of one type of lithium ion accumulator that is less sensitive to overcharging compared with other types of lithium ion accumulators.

Further advantages of the invention will become apparent from the specification and the attached drawing.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Certain embodiments of the invention are shown in the drawing and will be discussed in more detail in the specification that follows. In the drawing

DETAILED DESCRIPTION OF THE PREFERRED EMBODIMENTS

Figure 1:
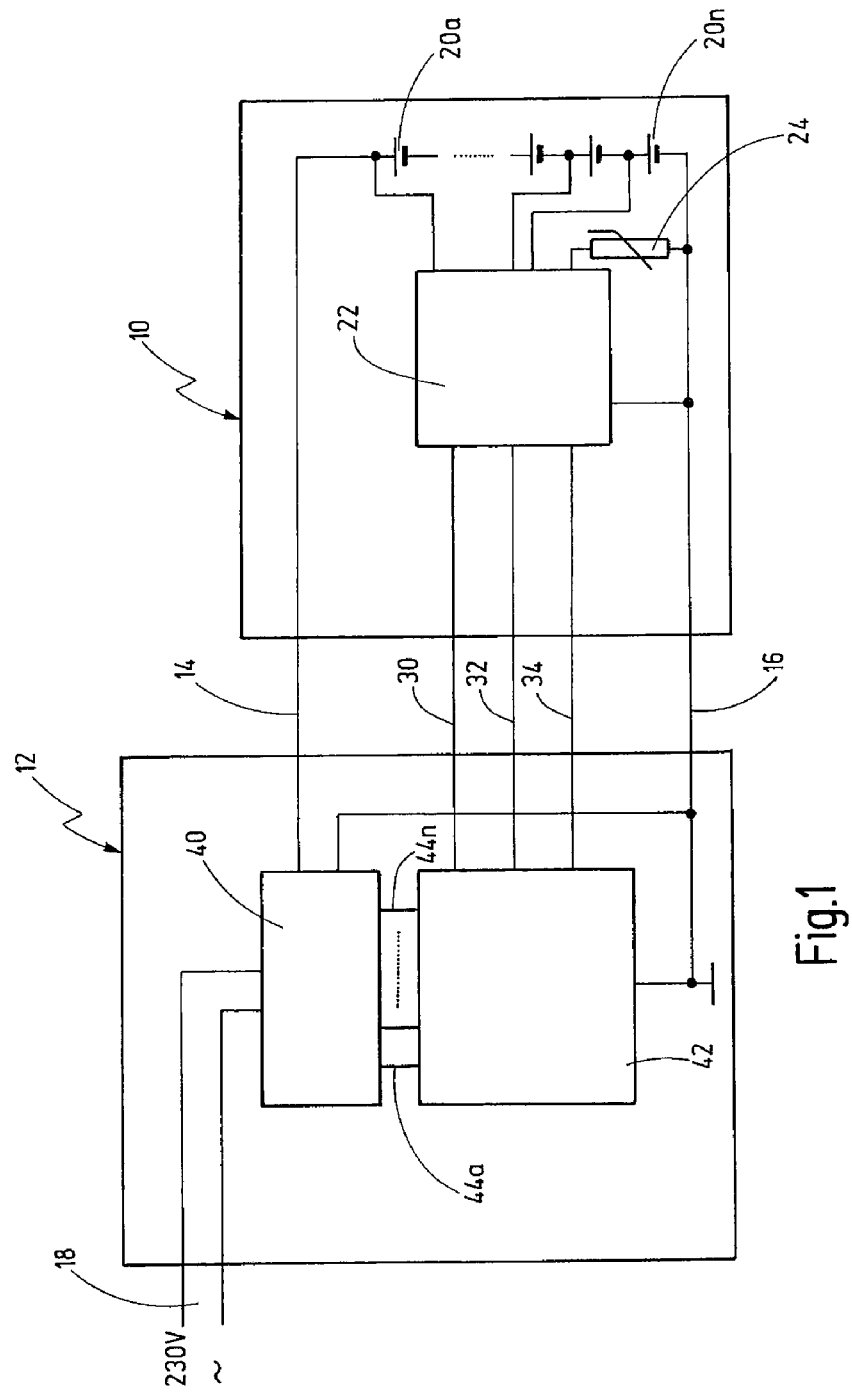
FIG. 1 shows a schematic circuit diagram of an accumulator connected to one embodiment of a charging device according to the invention.

In FIG. 1, an accumulator, colloquially also known as "battery pack", is indicated generally by reference numeral 10. The accumulator is a lithium ion accumulator, preferably a lithium iron phosphate accumulator.

The accumulator 10 is connected to a charging device 12. The connection between the charging device 12 and the accumulator 10 is established by a positive line 14 and a grounding line 16. The charging device 12 is connected to a mains, for example a 230 V AC mains, via a supply line 18.

The accumulator 10 comprises n cells 20a-20n in series connection. The cells 20a-20n are connected to an electronic monitoring system 22. Arranged close to the cells 22a-22n is a temperature sensor 24, for example an NTC resistor, which is likewise connected to the electronic monitoring system 22.

The electronic monitoring system 22 comprises means capable of generating signals that correspond to the charging current I, the charging voltage U, the inner resistance $R_i$ of the cells 22a-22n, the temperature I of the cells 22a-22n and, in certain cases, to other parameters characteristic of the charging state of the accumulator. Especially, the electronic monitoring system 22 is capable of detecting the variation in time, i.e. the first time derivative of those parameters, and of generating corresponding signals, for example $dU/dt$, $dI/dt$, $dT/dt$ and $dR_i/dt$. Preferably, it is the rise in time of the aforementioned parameters that is monitored.

Alternatively, the electronic monitoring system 22 may also be arranged in the charging device 12.

Further, the electronic monitoring system 22 may generate from those signals secondary signals indicating, for example, an alarm condition of the cells 22a-22n, for example a state of imminent overcharging, of imminent complete undercharging, overvoltage, overload current, overheating, etc. The signals so determined and/or processed are sent to the charging device 12 via signal lines 30, 32 and 34.

The charging device 12 comprises a switching-mode power supply 40 and an electronic control 42 that are connected one to the other via a plurality of control lines 44a-44n. The electronic control system 42 receives the signals discussed above via the signal lines 30, 32 and 34 and adjusts the charging current I via the switching-mode power supply 40 in the manner envisaged by the method according to the invention.

Once a signal indicating an alarm condition of the cells 22a-22n is generated by the electronic monitoring system 22 in the manner described above that signal causes the charging device 12 to be switched off in full. For example, if no alarm condition is detected, a signal "0" will appear on the signal line 30, while a finite voltage signal "1" of, for example, +18 V will be encountered when an alarm condition is detected indicating, for example, an imminent overcharging or an imminent fully discharged condition.

As shown in FIG. 1, the electronic monitoring system 22 may be located in the accumulator 10. Alternatively, it is however also possible to accommodate at least part of the electronic monitoring system outside the accumulator 10, for example in the charging device 12.

It should be noted in this connection that the described alarm cut-off function may be used also when the accumulator 10 is connected to a consumer, for example to an electric tool. When there is an imminent risk of an accumulator 10 getting fully discharged in operation of the consumer, then the alarm signal causes the consumer to be cut off via the corresponding connection to the consumer.

Figure 2:
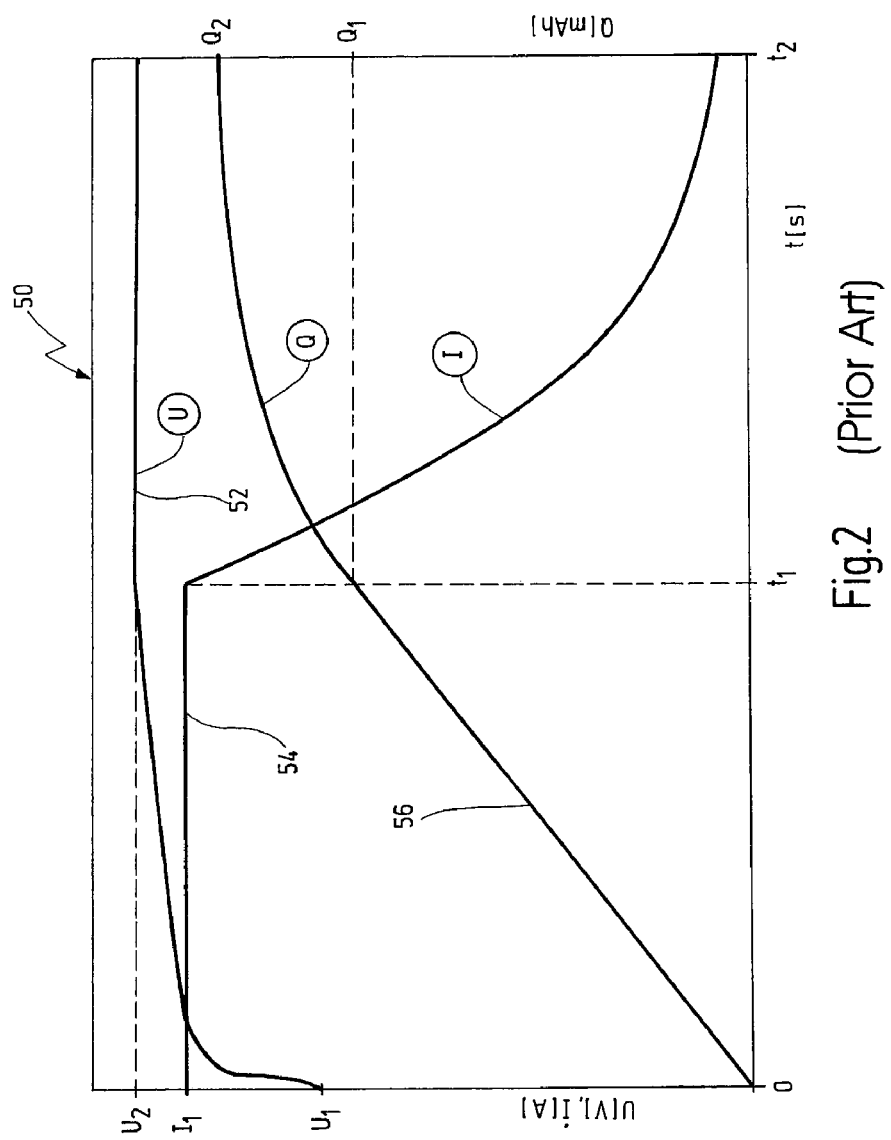
FIG. 2 shows graphical representations of curves of the current, the voltage and the charge during the charging process of a lithium ion accumulator of the prior art.

FIG. 2 shows a first diagram of a prior-art arrangement illustrating three time curves, namely a curve 52 for the charging voltage U, a curve 54 for the charging current I and a curve 56 for the charge Q, i.e. the charging state of the accumulator 10. It will be noted that the accumulator 10 is initially charged by a constant current $I=I_1$ so that the charge Q will gradually rise starting from zero. At the same time, the voltage likewise rises starting from an initial value $U=U_1$ until it reaches a predetermined limit value of $U=U_2$ at the time $t_1$. At that time, the accumulator 10 has been charged to a value of $Q=Q_1$ only. From that point on, the current I is controlled to a constant voltage $U_2$ so that it will gradually drop to zero while the charge Q approaches the threshold value $Q_2$.

Figure 3:
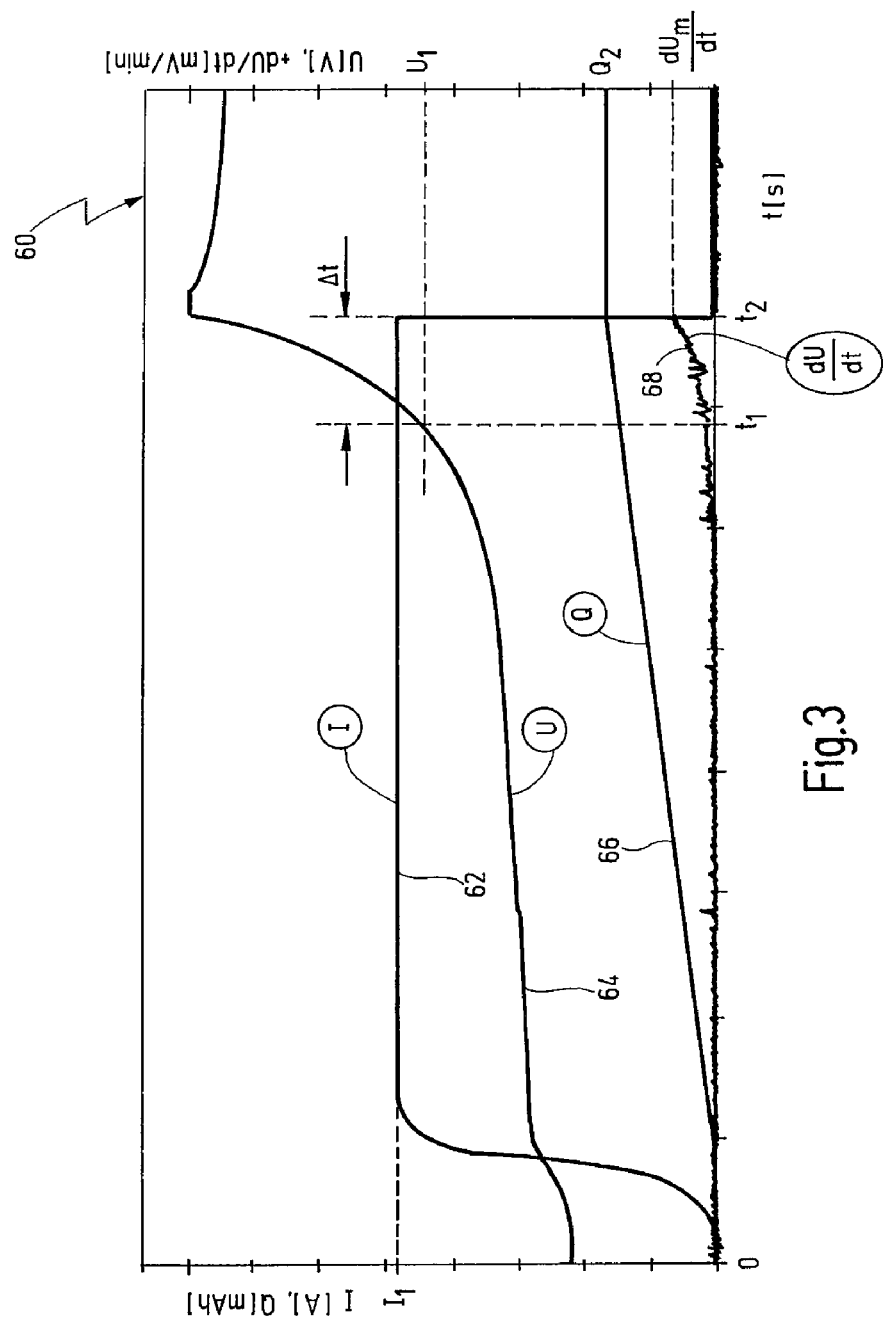
FIG. 3 shows a representation similar to that of FIG. 2, but for one embodiment of a method according to the invention used for charging a first lithium iron phosphate accumulator.

In contrast, FIG. 3 shows a diagram 60 illustrating one embodiment of the method according to the invention, comprising a curve 62 of the charging current 1, a curve 64 of the charging voltage U and a curve 66 of the charge Q as well as a curve 68 of the first time derivative of the voltage dU/dt.

In this case, the current I is gradually raised from zero to a value $I_1$ where it remains constant until it is found, at the time $t_1$, that the voltage U has reached a predefined limit value $U_1$. Contrary to the conventional way of proceeding, as illustrated in FIG. 2, the system now continues its constant injection of current I into the accumulator 10. During that process, the rise over time $dU_m/dt$ is monitored until it is found in this case as well that a limit value dU/dt has been reached. It is only at that point in time that the current I is reduced. As can be noted from the curve 64 of the voltage U, the voltage U has once more clearly risen during the additional time interval Δt between the points in time where the two limit values $U_1$ and $dU/dt_1$ were reached, which does not however present any risk for the accumulator 10, especially if the latter is of the lithium iron phosphate type.

The charging process is terminated in this case at the time $t_2$ at a charge of 100%. The current I is reduced to zero abruptly at that point in time.

Figure 4:
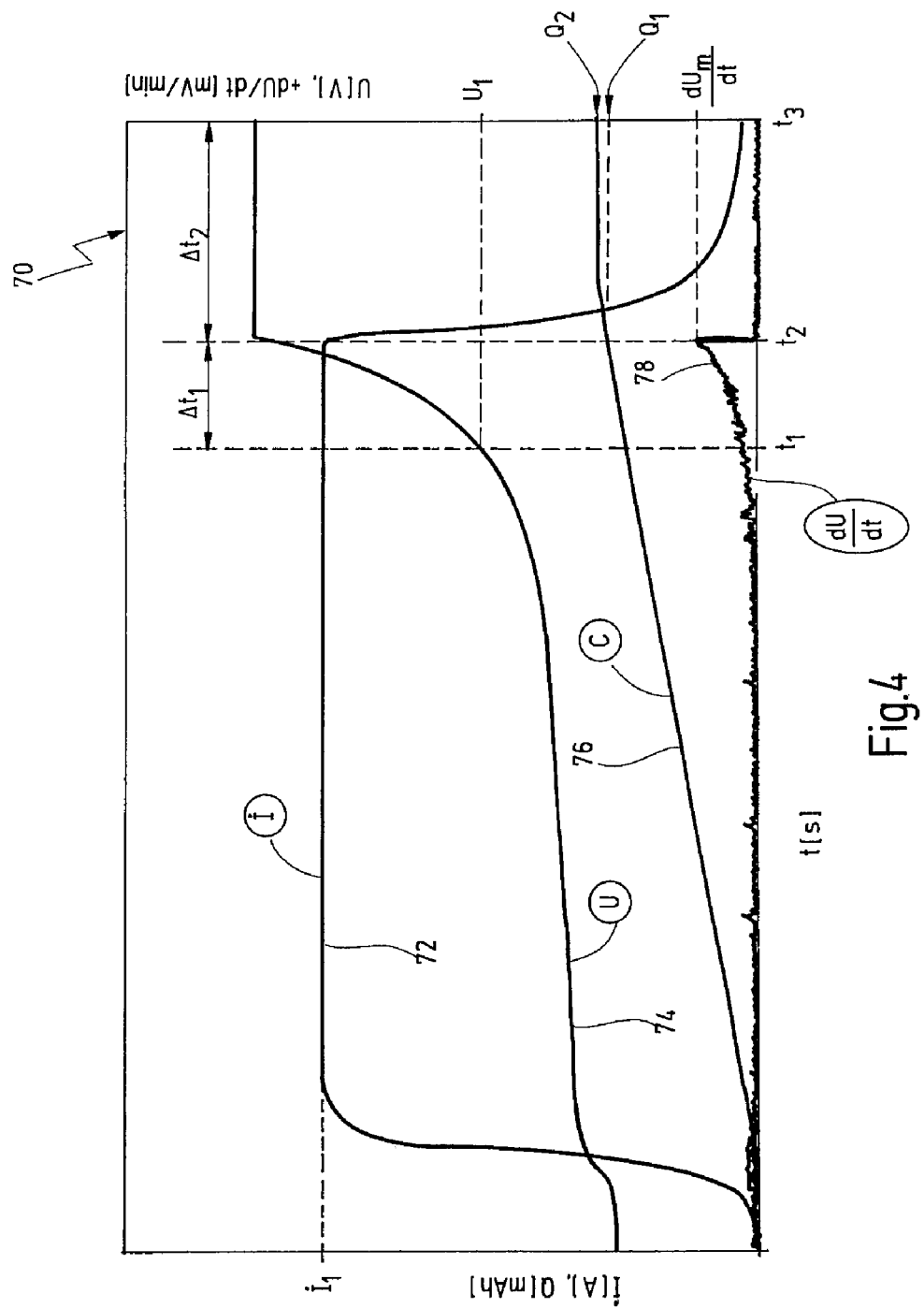
FIG. 4 shows a representation similar to that of FIG. 3, but for one embodiment of the method according to the invention used for charging a second lithium iron phosphate accumulator.

Finally, FIG. 4 shows a charging process similar to that illustrated in FIG. 3, at the same scale but for a different accumulator and a somewhat different charging process. The reference numerals in FIG. 4 have been increased by 10 compared with those used in FIG. 3. For the rest, the discussion relating to FIG. 3 applies to FIG. 4 as well.

In the embodiment illustrated in FIG. 4, the charging process has not yet ended at the time $t_2$. Instead, the process is controlled so that the accumulator will be charged by, for example, 95% only at the time $t_2$. A further increase of the charge Q from the charge $Q_1$ of, for example, 95% reached at the time $t_2$ at the end of the time interval Δt, to a value $Q_2$ of 100% will be achieved only after an additional time interval $Δt_2$ between the time $t_2$ and the complete termination of the charging process at the time $t_3$. During the time interval $Δt_2$ the current I is gradually reduced to zero for this purpose. That way of proceeding allows the accumulator to be recharged even more gently.

Due to the fact that suitable means are provided in the electronic monitoring system 22 for the generation of signals representative of the charging current I, the charging voltage U, the internal resistance $R_i$ of the cells 22a-22n, the temperature T of the cells 22a-22n and, in some cases, of further parameters characteristic of the charging state of the accumulator, the method according to the invention may also use dT/dt or $dR_i/dt$, for example, instead of the variation in time, especially the rise in time of the voltage dU/dt. There is also the possibility to process more than one such curves in parallel and to reduce the current I at the time the limit value of the first such curve is reached.

What is claimed is:

1. A method for charging a rechargeable lithium iron phosphate accumulator, comprising the steps of:
   providing a rechargeable lithium iron phosphate accumulator;
   injecting a charging current into the accumulator;
   monitoring a voltage of the accumulator during the injection process;
   monitoring a variation in time of at least said voltage; and
   continuing the injection of the charging current into the accumulator until said variation in time of said voltage exceeds a predefined positive threshold value, wherein the charging current is gradually reduced to zero when the variation in time of said voltage exceeds said predefined threshold value.

2. The method of claim 1, wherein said charging current is controlled along a predefined time characteristic.

3. The method of claim 2, wherein said charging current is kept constant over time.

4. The method of claim 2, wherein said charging current is periodically shaped.

5. The method of claim 4, wherein said charging current is pulsed.

6. The method of claim 1, wherein at least one of a variation in time of a temperature and a variation in time of an internal resistance of said accumulator is monitored.

7. The method of claim 1, wherein at least one of a rise in time of a temperature and a rise in time of an inner resistance of said accumulator is monitored.

8. The method of claim 1, wherein a lithium iron phosphate accumulator is charged.

9. The method of claim 1, wherein the accumulator is configured for powering an electric power tool.

10. A charging device for charging a rechargeable lithium iron phosphate accumulator comprising:
    first means for injecting a charging current into the rechargeable lithium iron phosphate accumulator,
    second means for monitoring the voltage on the rechargeable lithium iron phosphate accumulator during the injection process,
    third means for monitoring a variation in time of said voltage, and
    fourth means for continuing injection of the charging current into the rechargeable lithium iron phosphate accumulator until the variation in time of said voltage exceeds a predetermined positive threshold value, and for gradually reducing the charging current to zero when the variation in time of said voltage exceeds said predefined limit value.

* * * * *